Aug. 13, 1957  E. V. CHRISTENSEN ET AL  2,802,648
PROPORTIONING AND MIXING FLUID DISPENSING DEVICE
Filed Dec. 1, 1953  3 Sheets-Sheet 3
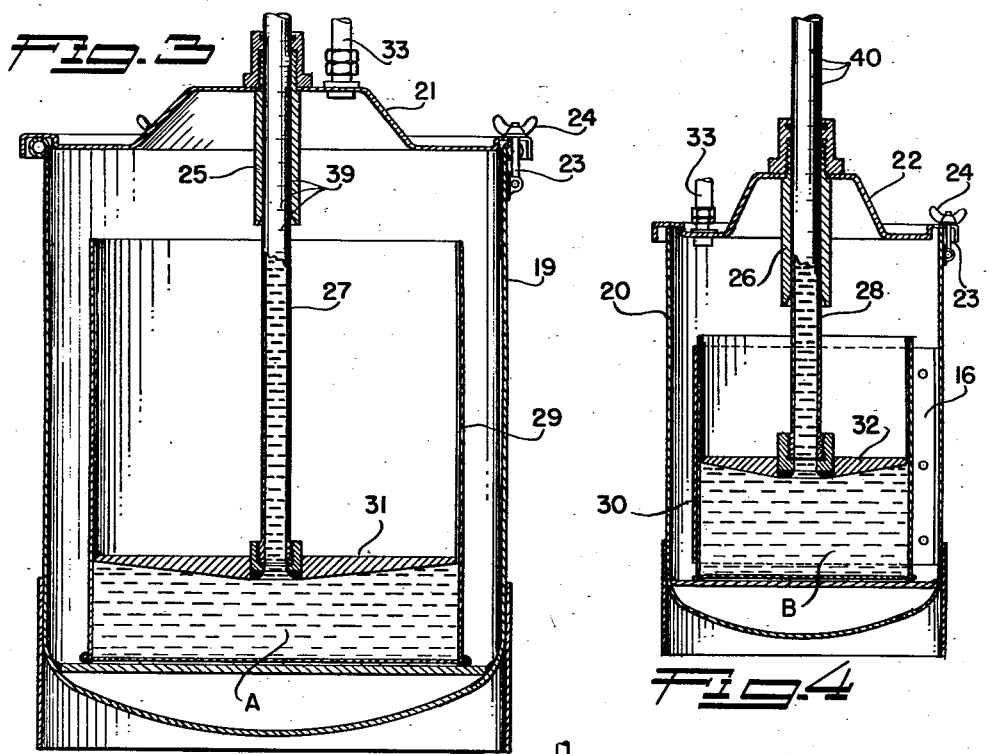
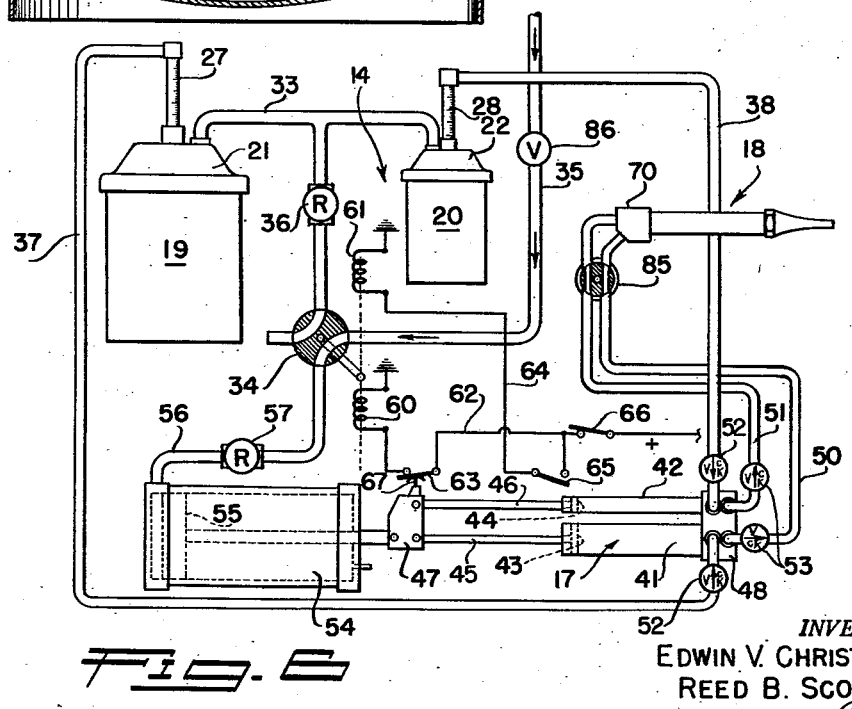
INVENTORS
EDWIN V. CHRISTENSEN
REED B. SCOTT
By George C. Sullivan
Agent United States Patent Office 2,802,648
Patented Aug. 13, 1957

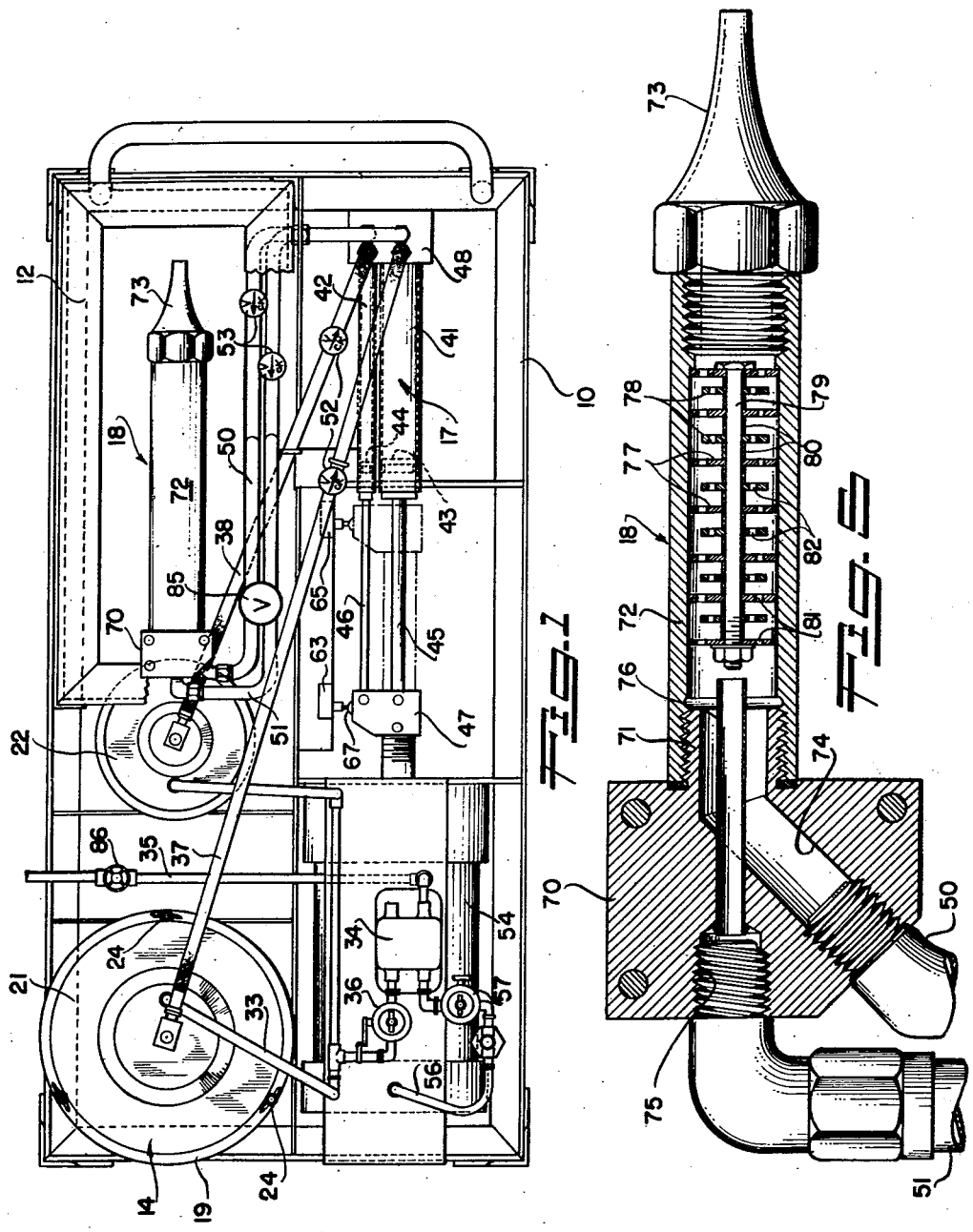

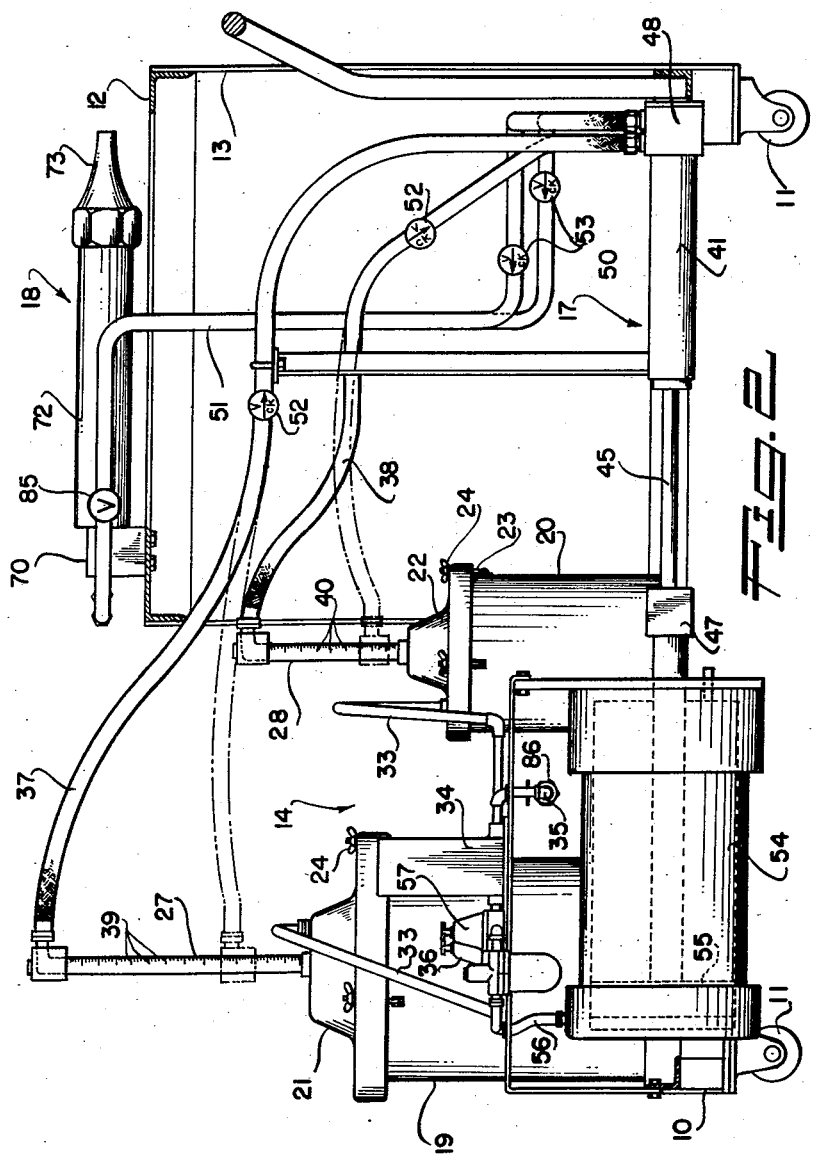

2,802,648

PROPORTIONING AND MIXING FLUID DISPENSING DEVICE

Edwin V. Christensen, Hollywood, and Reed B. Scott, Encino, Calif., assignors to Lockheed Aircraft Corporation, Burbank, Calif.

Application December 1, 1953, Serial No. 395,438

6 Claims. (Cl. 259—18)

This invention relates to the mixing and dispensing of liquids and semi-fluid materials and relates more particularly to a device or machine for proportioning and mixing two or more such fluids and for dispensing the resultant mixture.

There are many instances in the various industries where it is necessary to mix two or more materials in given proportionate volumes or quantities shortly before the application or use of the resultant mixtures. One such instance is the mixing of the Thiokol types synthetic rubber compositions with the appropriate accelerators in the proper proportions just prior to the use of the resultant putty-like synthetic rubber compounds. Other examples are the proportioning and mixing of certain resins and reactants, resins and fillers, and resins and foaming agents to produce reactant or quick setting coating compositions, cellular products, sealants, etc. In such situations it has been the common practice to provide the workman with the separate packages containing the two or more basic ingredients or compounds so that he may mix the ingredients in the required proportion at the job. Such manual proportioning and mixing operations are time consuming and, therefore, costly, are often wasteful of the ingredients, and are productive of inconsistent or non-uniform products because the accurate proportioning of the ingredients and the thorough mixing thereof are not only difficult but are often improperly performed.

It is a general object of the present invention to provide a simple, practical and effective unit or machine for accurately proportioning two or more liquids, for thoroughly mixing the same and for dispensing or ejecting the resultant mixture for use, packaging, or the like.

Another object of the invention is to provide a device or machine of the character mentioned that is relatively small, compact and portable to be readily employed at or near the area or point of use of the mixed materials.

Another object of the invention is to provide a machine of this kind that is automatic, that is it is power driven and operates to automatically dispense the mixed materials by performing a series of pumping, proportioning and mixing operations.

It is another object of the invention to provide a device of the type described in which provision is made to pump the separate materials or liquids from their original containers to the cylinders of the proportioning means. If desired, the materials may be supplied in separate packages or containers, as is the usual practice in certain industries, and the machine of the invention is designed to receive these containers and to directly pump or force the contents therefrom to the proportioning means.

It is another object of the invention to provide a machine of this class characterized by a unique proportioning means operable to automatically deliver measured or accurately proportioned streams of the two or more liquids to the mixing chamber for mixing therein.

A further object of the invention is to provide a device of this class having a simple, practical mixing means for thoroughly, intimately and rapidly mixing the liquids supplied thereto by the proportioning means.

Other objectives and features of the invention will become apparent from the following detailed description of a typical preferred embodiment illustrated in the accompanying drawings wherein:

Figure 1 is a top or plan view of the device;

Figure 2 is a side elevation of the machine or device;

Figure 3 is an enlarged vertical sectional view of the means for pumping or forcing a liquid from one of the supply containers;

Figure 4 is a view similar to Figure 3 illustrating the means for pumping or forcing the contents from a smaller container;

Figure 5 is an enlarged vertical detailed sectional view of the mixing means with certain associated parts appearing in side elevation; and Figure 6 is a diagrammatic or schematic flow diagram and wiring diagram of the device.

In accordance with the invention the device or machine may include a mobile or wheeled cart or carrier. In the drawings we have shown a carrier having a lower main frame 10 provided with suitable wheels or casters 11 to facilitate the easy movement of the device from place to place. The carrier is further provided with a raised shelf or support 12 carried by posts 13 rising from the main frame 10. The device may be said to comprise, generally, means 14 for pumping or forcing two or more liquids from their containers 29 and 30, proportioning means 17 receiving the liquids from the means 14, mixing means 18 receiving the proportioned liquids from the means 17 and operating to mix the same for use and other instrumentalities, the functions and details of which will be hereinafter described.

The means 14 is adapted to receive supplies or charges of the materials or liquids to be handled and may be constructed to receive two, three or more such charges. In the simple form of the invention illustrated the means 14 handles two such supplies or charges and pumps or forces the two materials therefrom to the proportioning means 17. Accordingly the means 14, as illustrated, has two pressure vessels 19 and 20 mounted on the frame 10 in spaced adjacent relation. The vessels 19 and 20 are preferably upright containers having closed lower ends and provided at their upper ends with removable lids or caps 21 and 22. The caps 21 and 22 are securely but removably held in the closed positions on the upper ends of their respective vessels 19 and 20 by hinged bolts 23 and nuts 24. The cap 21 has a central vertical tubular guide 25 and the cap 22 has a similar guide 26. Tubular plunger rods 27 and 28 are slidable in the guides 25 and 26 respectively to extend into the pressure vessels. The vessels 19 and 20 are adapted to receive containers 29 and 30 respectively, the containers being arranged to rest on the bottom walls of the vessels. If desired or necessary, lateral supports or stabilizing members 16 may be provided in the vessels to hold the containers substantially centralized therein. In practice the containers 29 and 30 may be the cans or containers in which the two materials or liquids to be mixed are supplied for use. If this is the case the lids or upper ends of these cans are cut off prior to arrangement in the vessels so that the upper ends of the containers are open, as illustrated in Figures 3 and 4. In other cases the containers 29 and 30 may be parts or elements of the machine in which case they are filled or supplied with their respective liquids from other sources.

The means 14 further includes a plunger 31 on the lower end of the rod 27 for operating downwardly in the container 29 and a plunger 32 on the rod 28 for operation in the container 30. The plungers 31 and 32 are proportioned to move in their respective containers 29 and 30 with substantial clearance so that as they move downwardly therein thin films of the liquids remain on the walls of the containers to form fluid seals around the plungers. The plungers 31 and 32 are secured to their respective tubes or rods 27 and 28 so as to leave the lower ends of the rods open for the reception of the liquids. In accordance with the invention the plungers 31 and 32 are actuated downwardly by air under pressure supplied to the interiors of the vessels 19 and 20. An air pressure manifold 33 has ends coupled with the caps 21 and 22 so as to communicate with the vessels 19 and 20 and the manifold extends to a valve 34. The valve 34 in turn is operable to either connect the manifold 33 with an air pressure supply line 35 or to put the manifold in communication with the atmosphere, see Figure 6. The portions of the manifold 33 connected with the caps 21 and 22 are flexible so as to permit the easy attachment and removal of the caps. A pressure regulator 36 may be provided in the manifold.

It will be assumed that the liquid A in the container 29 is to form the predominant or principal ingredient of the mixture to be produced and the liquid B in the container 30 is to constitute the secondary or smaller proportion of the mixture. Accordingly, as illustrated in the drawings, the container 29 is considerably larger than the container 30 and the respective vessels 19 and 20 may be proportioned accordingly. As the plungers 31 and 32 are forced downwardly in their respective containers 29 and 30 by the air under pressure in the vessels 19 and 20, the respective liquids A and B are forced outwardly through the tubular rods 27 and 28. Liquid pressure pipes or lines 37 and 38 are connected with the upper ends of the rods 27 and 28 respectively, and extend to the proportioning means 17 to be described below. The portions of the lines 37 and 38 connected with the rods 27 and 28 are flexible so as to permit free movement of the rods. The rods 27 and 28 are visible above the vessels 19 and 20 and may have calibrations 39 and 40 to visually indicate the amounts of the liquids A and B remaining in the containers 29 and 30. The proportioning means 17 receives the liquids A and B from the above described means 14 and operates to pump or force the same to the mixing means 18 in a given selected relative proportion. For example, the liquids may be supplied to the mixing means 18 in the proportion of one part of the fluid B to from one to twenty-five parts of the fluid A, the ratio of the fluids being determined by the diameters and strokes of two cylinders 41 and 42 of the means 17. These two cylinders 41 and 42 are preferably arranged in adjacent parallel relation and have pistons 43 and 44 operating therein. The pistons 43 and 44 have rods 45 and 46 respectively, extending from corresponding ends of their respective cylinders 41 and 42 and the outer ends of the rods are connected to a block 47. The line 37 extending from the means 14 and handling the fluid A, communicates with an end of the cylinder 41 and the line 38 carrying the fluid B communicates with the corresponding end of the cylinder 42. Thus the two liquids A and B are conducted to the cylinders 41 and 42 under pressure and are operable to move the pistons 43 and 44 outwardly therein. In practice, the lines 37 and 38 communicate with their respective cylinders through a common manifold block 48 which also has discharge lines 50 and 51 communicating respectively with the cylinders 41 and 42, which discharge lines extend to the mixing means 18, to be hereinafter described. The lines 37 and 38 conducting the liquids A and B to the cylinders 41 and 42 are equipped with check valves 52 to prevent reverse flow through the lines and the lines 50 and 51 have check valves 53 for preventing reverse flow therethrough.

The proportioning means 17 further includes an actuating cylinder 54 having a piston 55 operable therein and connected to the above mentioned block 47. An actuating air pressure line 56 extends from the valve 34 to the outer end of the cylinder 54 and the line may have a pressure regulator 57. The opposite or inner end of the cylinder 54 is ported to the atmosphere. When the liquids A and B are being forced into the proportioning cylinders 41 and 42 the valve 34 is in the position where the cylinder line 56 is in communication with the atmosphere and the manifold 33 of the vessels 19 and 20 is in communication with the air pressure supply line 35. At the end of this stroke or cycle the valve 34 is reversed to put the cylinder line 56 in communication with the pressure supply line 35 and to put the vessel manifold line 33 in communication with the atmosphere. Upon this reversal of the valve 34 the air under pressure supplied to the cylinder 54 forces the piston 55 to the right, as seen in Figure 6, to actuate the proportioning pistons 43 and 44 to the right and thus force proportioned streams of the liquids A and B through the lines 50 and 51 to the mixing means 18.

The invention includes a control means for automatically operating or reversing the valve 34 to alternately supply air under pressure to the vessels 19 and 20 and to the actuating cylinder 54 so that the liquids A and B are first supplied to the proportioning cylinders 41 and 42 and are then forced or discharged from their respective proportioning cylinders to the mixing means 18 during each complete cycle of the apparatus. This automatic cycling means includes two solenoids 60 and 61 for actuating the valve 34 between its two positions. The energizing circuit 62 of the solenoid 60 is controlled by a switch 63 and the energizing circuit 64 of the winding or solenoid 61 is controlled by a similar switch 65. The switches 63 and 65 are of the normally open type and the power line supplying the two circuits 62 and 64 is preferably equipped with a main control switch 66. The switches 63 and 65 are constructed and arranged to be actuated or closed by a cam or shoe 67 carried by the above described piston rod block 47.

When the proportioning pistons 43 and 44 are at the right hand ends of their respective cylinders 41 and 42, as viewed in Figure 6, the cam or shoe 67 will have closed the switch 65. This results in energization of the winding 61 to actuate the four-way valve 34 to the position where the air supply line 35 delivers air under pressure to the vessels 19 and 20. As above described, this air pressure acting on the plungers 31 and 32 forces the liquids A and B through the lines 37 and 38 into the proportioning cylinders 41 and 42. The liquids thus forced into the cylinders moves the pistons 44 and 43 and the piston 55 to the left until the pistons approach the end of their strokes. This brings the cam or shoe 67 into cooperation with the switch 63 and the switch 63 is closed to energize the solenoid 60. Solenoid 60 reverses the valve 34 to connect the pressure line 35 with the actuating cylinder line 56. Air under pressure acting on the piston 55 returns the proportioning pistons 43 and 44 to the right thus forcing proportioned amounts of the liquids A and B out through the lines 50 and 51 to the mixing means 18. When the pistons 43 and 44 approach the end of this stroke the shoe 67 again closes the switch 65 to energize the solenoid 61 and the cycle may thus be repeated.

The mixing means 18 receives the proportioned streams of the liquid A and B from the lines 50 and 51, mixes the flowing liquid into a homogeneous mixture and then discharges the resultant mixture. The mixing means includes a block 70 secured to the shelf or raised support 12 of the frame 10. The block 70 has a boss 71 and a mixing chamber or tube 72 is threaded on the boss. In practice the tube 72 may be horizontal and is provided at its outer end with a discharge nozzle 73. The nozzle 73 is preferably removably threaded with the end of the tube 72. The block 70 has a relatively large port 74 leading to the inner end of the tube 72 and the line 50 carrying the liquid A from the cylinder 41 is connected to the block to discharge into this port. The block 70 has a second somewhat smaller port or bore 75 and the line 51 carrying the liquid B from the proportioning cylinder 42 is connected to the block to discharge into this port. A tube 76 is secured in the port 75 and extends through the block 70 to pass centrally through the inner portion to the larger port 74 and to extend into the mixing tube 72. With this arrangement the larger port 74 supplies the larger volume liquid A in an annular stream entering the mixing tube 72 around the smaller central stream of the liquid B. It is preferred to interpose a dual control valve or cut-off valve 85 in the liquid lines 50 and 51 so that the flow of the liquids to the mixing means 18 may be controlled or cut off as required.

The mixing means 18 further includes an assembly or series of perforated discs within the tube 72. There is a plurality of longitudinally spaced discs 77 fitting in the tube 72 and smaller diametered discs 78 spaced between several discs 77. The discs 77 and 78 are assembled on a rod 79 and are spaced apart by tubular spacers 80 on the rod. The discs 77 have circumferentially spaced ports or openings 81 and the discs 78 have similar openings 82. The openings 82 are offset radially and if desired, circumferentially from the openings 81. The assembly of the discs 77 and 78 and the rod 79 preferably constitutes a unit that may be easily removed from the tube 72 when the same is detached from the block 70. The nozzle 73 is also removable so that the various elements of the mixing means 18 may be easily stripped and cleaned after use. The two fluids or liquids flowing through the mixing tube 72 under pressure are obliged by reason of the discs 77 and 78 and their offset ports 81 and 82 to follow tortuous paths and to co-mingle as they pass axially through the mixing tube. The discs 77 and 78 and their offset ports 81 and 82 of relatively small diameter set up eddy currents and regions of increased and decreased velocity which are effective in bringing about a thorough mixing of the liquids so that the mixture is homogeneous by the time it enters the nozzle 73.

It is believed that the operation and features of the proportioning and mixing machine of the invention will be apparent from the foregoing detailed description. To condition the machine for use the containers 29 and 30 of the two liquids are placed in their respective vessels 19 and 20 and the plungers 31 and 32 are entered in their open upper ends whereupon the caps 21 and 22 are secured in place on the vessels. Assuming the proportioning means 17 to be in the condition where the four-way valve 34 supplies air under pressure to the vessels 19 and 20, the main switch 66 may be closed and the actuating air under pressure may be supplied to the machine by opening a master valve 86 in the supply line 35. As above described, the air under pressure in the vessels 19 and 20 acting on the plungers 31 and 32 causes the two liquids A and B to flow under pressure into their respective cylinders 41 and 42 so as to displace or move the pistons 43 and 44 until the shoe 67 closes the switch 63 whereon the valve 34 is reversed. The reversal of the valve 34 causes the piston 55 to be actuated or returned to force the liquids A and B out of the proportioning cylinders through the lines 50 and 51 and the mixing means 18 where they are thoroughly mixed before discharge from the nozzle 73. When the pistons 43 and 44 approach their original positions the shoe 67 recloses the switch 65 to initiate a second cycle of operation.

The invention contemplates the employment of proportioning cylinders 41 and 42 of any selected ratio of volumes or capacities to adapt the machine for the accurate proportioning of the liquids in any ratio. Furthermore, while we have shown but two proportioning cylinders, it is apparent that three or more may be operated and employed in the manner described above. In certain applications of the invention it may not be necessary or desirable to mix the two fluids, as proportioned by the machine, in which case the liquids may be directly discharged from the lines 50 and 51.

Depending upon the natures or characters of the liquids being handled the several elements of the mixing means 18 may be plated, coated, or otherwise prepared with parting compounds to prevent adherence of the liquids or facilitate stripping and cleaning of the parts after use. In some cases it may be practical to construct the several parts of the mixing means 18 of materials such as nylon, Teflon, polyethylene type resins, or other synthetic products which resist adherence of the liquids handled. Furthermore, it is contemplated that the nozzle 73, the tube 22, and/or the internal units comprising the discs 77 and 78 and the rod 79 may be inexpensively constructed so as to be discarded after use if necessary.

Having described only a typical form of the invention we do not wish to be limited to the specific details herein set forth, but wish to reserve to ourselves any variations or modifications that may appear to those skilled in the art and fall within the scope of the following claims.

We claim:

1. A device for proportioning liquids including proportioning cylinders of different diameters, pistons operable in the cylinders, rods for the pistons extending from the cylinders, separate liquid containers, fluid pressure means operable to force the liquids from said containers to the cylinders so that each cylinder receives but one liquid and so that the pistons are moved in one direction by the liquids entering the cylinders, liquid conduits leading from the cylinders, fluid pressure means attached to said rods for simultaneously moving the pistons in the other direction to discharge the proportioned liquids through the conduits including a cylinder and piston mechanism, and a mechanical connection between said mechanism and the two piston rods, and a control system for alternately operating the two fluid pressure means.

2. A device for proportioning liquids including proportioning cylinders of different diameters, pistons operable in the cylinders, separate liquid containers, fluid pressure means operable to force the liquids from said containers to the cylinders so that each cylinder receives but one liquid and so that the pistons are moved in one direction by the liquids entering the cylinders, liquid conduits leading from the cylinders, means connecting the pistons for movement in unison, actuating cylinder means for simultaneously moving the connected pistons in the other direction to discharge the proportioned liquids through the conduits, means receiving and mixing together the liquids flowing through the conduits, and a control system for alternately operating said fluid pressure means and said actuating cylinder means.

3. A device for proportioning liquids including proportioning cylinders of different diameters, pistons operable in the cylinders, rods for the pistons, separate liquid containers, fluid pressure means operable to force the liquids from said containers to the cylinders so that each cylinder receives but one liquid and so that the pistons are moved in one direction by the liquids entering the cylinders, liquid conduits leading from the cylinders, means connecting the piston rods for movement in unison, actuating cylinder means connected with said rods for simultaneously moving the pistons in the other direction to discharge the proportioned liquids through the conduits, and a control system for alternately operating the two fluid pressure means comprising an actuating fluid pressure line, valve means controlling the communication of said line with the two said fluid pressure means, and a control circuit controlled by movement of the rods for operating the valve means.

4. A device for proportioning liquids including proportioning cylinders of different diameters, pistons operable in the cylinders, separate liquid containers, fluid pressure means operable to force the liquids from said containers to the cylinders so that each cylinder receives but one liquid and so that the pistons are moved in one direction by the liquids entering the cylinders, liquid conduits leading from the cylinders, fluid pressure means for simultaneously moving the pistons in the other direction to discharge the proportioned liquids through the conduits including an actuating piston operatively connected with the first named pistons, and a control system for alternately operating the two fluid pressure means comprising an actuating fluid pressure line extending to each of said fluid pressure means, a source of actuating fluid pressure, valve means operable to alternately place said lines in communication with said source, electrical means for operating the valve including energizing circuits, and switches in said circuits operated by said pistons.

5. In a machine for dispensing liquids in given relative proportions the combination of; proportioning cylinders, the cylinders being of different diameters, pistons operable in the cylinders, individual liquid containing means each including a liquid container and a pressure vessel enclosing the container, means for conducting pressure to the vessels, plungers operable in the containers by the pressure in the vessels, separate lines for conducting the liquids from the containers to the cylinders so that each cylinder receives a different liquid under pressure which moves its respective piston in one direction, an actuating cylinder means for simultaneously moving said pistons in the other direction, lines for conducting the proportioned liquids from the proportioning cylinders upon movement of the pistons in said other direction, and means for conducting actuating fluid pressure to the actuating cylinder.

6. In a machine for dispensing liquids in given relative proportions the combination of; proportioning cylinders, the cylinders being of different diameters, pistons operable in the cylinders, individual liquid containing means each including a liquid container and a pressure vessel enclosing the container, means for conducting pressure to the vessels, plungers operable in the containers by the pressure in the vessels, separate lines for conducting the liquids from the containers to the cylinders so that each cylinder receives a different liquid under pressure which moves its respective piston in one direction, an actuating cylinder means for simultaneously moving said pistons in the other direction, lines for conducting the proportioned liquids from the proportioning cylinders upon movement of the pistons in said other direction, means for conducting actuating fluid pressure to the actuating cylinder, and control means for alternately supplying fluid pressure to the two said conducting means.

References Cited in the file of this patent

UNITED STATES PATENTS

| | | |
|---|---|---|
| 1,000,641 | Tebbit | Aug. 15, 1911 |
| 2,370,759 | Thompson | Mar. 6, 1945 |
| 2,391,110 | Walker | Dec. 18, 1945 |
| 2,427,429 | Waite et al. | Sept. 16, 1947 |
| 2,613,023 | Reich | Oct. 7, 1952 |